Figure 1:
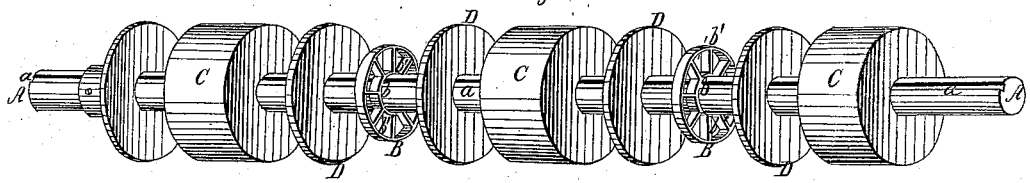

H. E. Smith,
Wringer Roll,
No. 52,615.   Patented Feb. 13, 1866.

Witnesses;
James H. Layman,
J. Mullen

Inventor;
H. E. Smith
By Knight Bros

UNITED STATES PATENT OFFICE.

HAMILTON E. SMITH, OF CINCINNATI, OHIO.

ROLLS FOR CLOTHES-WRINGERS.

Specification forming part of Letters Patent No. 52,615, dated February 13, 1866.

*To all whom it may concern:*

Be it known that I, HAMILTON E. SMITH, of Cincinnati, Hamilton county, Ohio, have invented a new and useful Improvement in Clothes-Wringer Rolls; and I do hereby declare the following to be a full, clear, and exact description thereof, reference being had to the accompanying drawings, making part of this specification.

Wood, leather, cork, and even metal having been successively tried as materials for clothes-wringer rolls left a desideratum in this class of devices, which india-rubber was thought to have supplied; but even rubber rolls of the customary forms have been found subject to serious defects from causes now to be explained.

It was first essayed to cast a solid cylinder of rubber upon a shaft either of square or other prismatic form, or one having longitudinal or transverse projections or depressions; but there being no material adhesion between the surfaces of the metal and gum, the latter would quickly become detached from the former, the splices, flanges, or other projections acting rather to accelerate the destruction of the gum by initiating fissures or cracks in the material thereof.

The next and more successful plan was to prepare a cylindrical or slightly-tapering shaft, and, having paid or wrapped the periphery thereof with twine saturated with liquid caoutchouc or other suitable cement, to force or drive a previously-cast rubber cylinder endwise upon said shaft. In this form, however, the rubber, from its extreme extensibility, is liable to become detached from the shaft. This experiment demonstrated the necessity of some device which would both connect the rubber securely to the shaft and which would also so grasp the body of the rubber as to prevent any inordinate or unequal extension of the rubber in a radial direction. A remedy for this defect was supposed to be found in the use of metallic washers, whose form relatively to the shaft was such as to secure rotation with the latter, which washers being interposed between a series of cylindrical blocks of rubber grasped the same endwise, and prevented undue radial expansion of the portion within the circumference of the washers.

This plan was, however, found to be subject to several serious defects: First, the prehensile surfaces, being still metallic, were totally lacking in any adhesive contact with the rubber, which was consequently free to expand and contract away from said surfaces; second, the metallic washers, being unyielding, had of necessity to be made of very small diameter, in order that they might not seriously detract from the high degree of compressibility required at every part of the roll, and were, of course, wholly unavailable for grasping the portion of the rubber beyond their own margins. Indeed the rubber was found to give way first at the line of contact of said margins, indicating injurious action from the unyielding edge of the metal itself.

Having thus briefly recited the more prominent pre-existing steps in the art, I will now proceed to describe my improvement.

Figure 2:
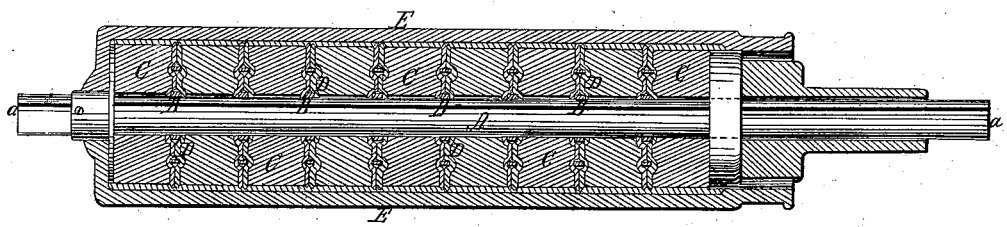
Figure 3:
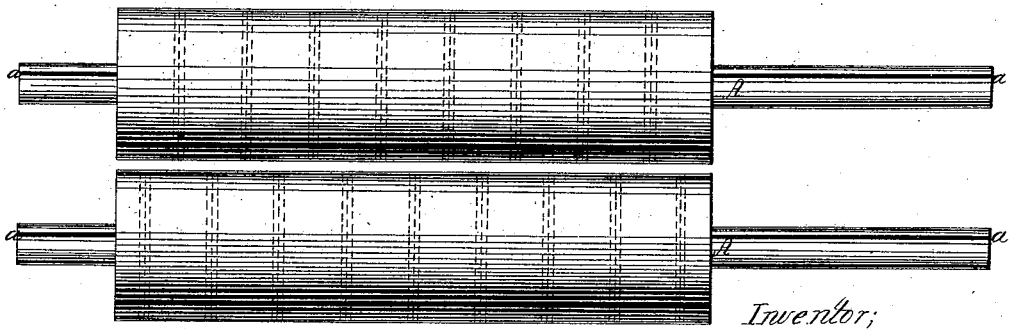

Figure 1 is a perspective view, showing the several elements or members of my roll strung loosely along their shaft. Fig. 2 is an axial section, showing a roll with the several members crowded together in the mold. Fig. 3 is a side elevation of a pair of my rolls. Fig. 4 is a section through a roll at the plane of separation of two contiguous wads.

A is the shaft, having a longitudinal groove, $a$. B are small metallic wheels or washers having tongues $b$ to enter the groove $a$ and apertures $b'$, for a purpose presently explained. C are cylindrical blocks or sections of india-rubber adapted to be slipped along the shaft A.

D are wads or disks of felt, or cloth, or other fibrous or woven stuff. Two such wads being saturated with rubber cement, and having a washer interposed between them, are introduced between every two consecutive blocks, and the whole series, being coated with, or enveloped in liquid rubber, is inclosed in a mold, E, and made to undergo compression in the manner customary with this class of manufactures.

In a roll thus constituted the substance of the wads and gum is made to enter the interstices of the washers, and on setting to form a complete dovetail or lock, while the rubber itself is preserved from undue radial expansion by the interposed wads of fibrous material, which, although grasping and supporting the blocks clear to their peripheries, yet do not in the least detract from their compressibility.

The provision of the wads D permits the use of washers of such small diameter as not to seriously detract from the compressibility of the rolls at the place of their introduction; but in order to practically equalize the amount of compressibility of every part, I form the respective rolls of each pair so as to break joints in the manner shown in Fig. 3.

The provision of the described fibrous wads or webs enables the use of washers of such small diameter as not seriously to impair the high degree of compressibility required in a clothes-wringer roll.

I have selected to illustrate my invention a form which actual use has proved to be efficient; but various modifications may obviously be made without departing from the essential characteristics of the improvement. For example, the shaft may have a ribbed or prismatic exterior in place of the groove $a$, the washers having a corresponding shape, and any form may be given to the washer which will serve to grasp without cutting or tearing of the substance of the rubber.

I claim herein as new and of my invention—

1. A clothes-wringer roll composed of sections C, of rubber or its equivalent, with interposed disks D, of cloth or other fibrous fabric, and rigid washers B, having a positive rotation with the shaft, substantially as set forth.

2. A pair of rolls formed in sections so arranged as to break joints, in the manner and for the purpose explained.

In testimony of which invention I hereunto set my hand.

HAMILTON E. SMITH.

Witnesses:
GEO. H. KNIGHT,
JAMES H. LAYMAN.